United States Patent [19]
Dewey

[11] Patent Number: 5,878,981
[45] Date of Patent: Mar. 9, 1999

[54] FLIGHT CONSOLE FOR RADIO CONTROLLED AIRCRAFT

[76] Inventor: Daniel L. Dewey, 6152 W. Oakland, #258, Chandler, Ariz. 85226

[21] Appl. No.: 843,253

[22] Filed: Apr. 14, 1997

[51] Int. Cl.[6] .............................. B64C 13/24; G09B 9/48
[52] U.S. Cl. .......................... 244/190; 244/223; 434/32; 434/45
[58] Field of Search ................................... 244/220, 221, 244/223, 232, 234, 235, 236, 190; 434/32, 33, 45

[56] References Cited

U.S. PATENT DOCUMENTS

| | | |
|---|---|---|
| 2,863,619 | 12/1958 | Servanty . |
| 3,303,714 | 2/1967 | Fontaine .............................. 244/233 X |
| 3,303,715 | 2/1967 | Zimer .................................. 244/223 X |
| 3,526,043 | 9/1970 | Frasca . |
| 3,564,134 | 2/1971 | Rue et al. ........................... 244/190 X |
| 4,386,914 | 6/1983 | Dustman ................................... 434/32 |
| 4,421,485 | 12/1983 | Geschwender ........................... 434/32 |
| 4,464,116 | 8/1984 | Schoolcraft ............................. 434/33 |
| 4,929,949 | 5/1990 | Yamamoto et al. ................ 244/190 X |
| 5,015,187 | 5/1991 | Lord ......................................... 434/33 |
| 5,129,826 | 7/1992 | Munsch .................................... 434/32 |
| 5,158,459 | 10/1992 | Edelberg .................................. 434/45 |
| 5,240,207 | 8/1993 | Eiband et al. .......................... 244/190 |

FOREIGN PATENT DOCUMENTS 3-5297  1/1991  Japan ..................................... 244/190

OTHER PUBLICATIONS

Nov. 9, 1973, Guy R. Williams, "The World of Model Aircraft", pp. 168–173.

*Primary Examiner*—William Grant
*Attorney, Agent, or Firm*—Frank J. Mcgue

[57] ABSTRACT

An control mechanism apparatus is shown which electro-mechanically actuates a control board of a radio transmitter. The radio transmitter transmits radio signals to a receiver on board a model aircraft for actuating the various parts thereof. The apparatus comprises a base frame for providing a stable platform with a seat mounted at the rear of the base frame. A plurality of controls emulating the controls found in a cockpit of an actual aircraft are mounted to the base frame. A plurality of mechanical linkages are provided which transmit the position of each of the plurality of controls to a corresponding plurality of electrical devices. Each of the corresponding electrical devices is in electrical communication with the control board and the output of each of the electrical devices varies in accordance with the position of the controls. The radio signals are transmitted by the radio transmitter control board and vary in accordance with the electrical output of each of the electrical devices. The radio signals actuate the various parts of the model aircraft corresponding to each of the plurality of the controls.

16 Claims, 5 Drawing Sheets

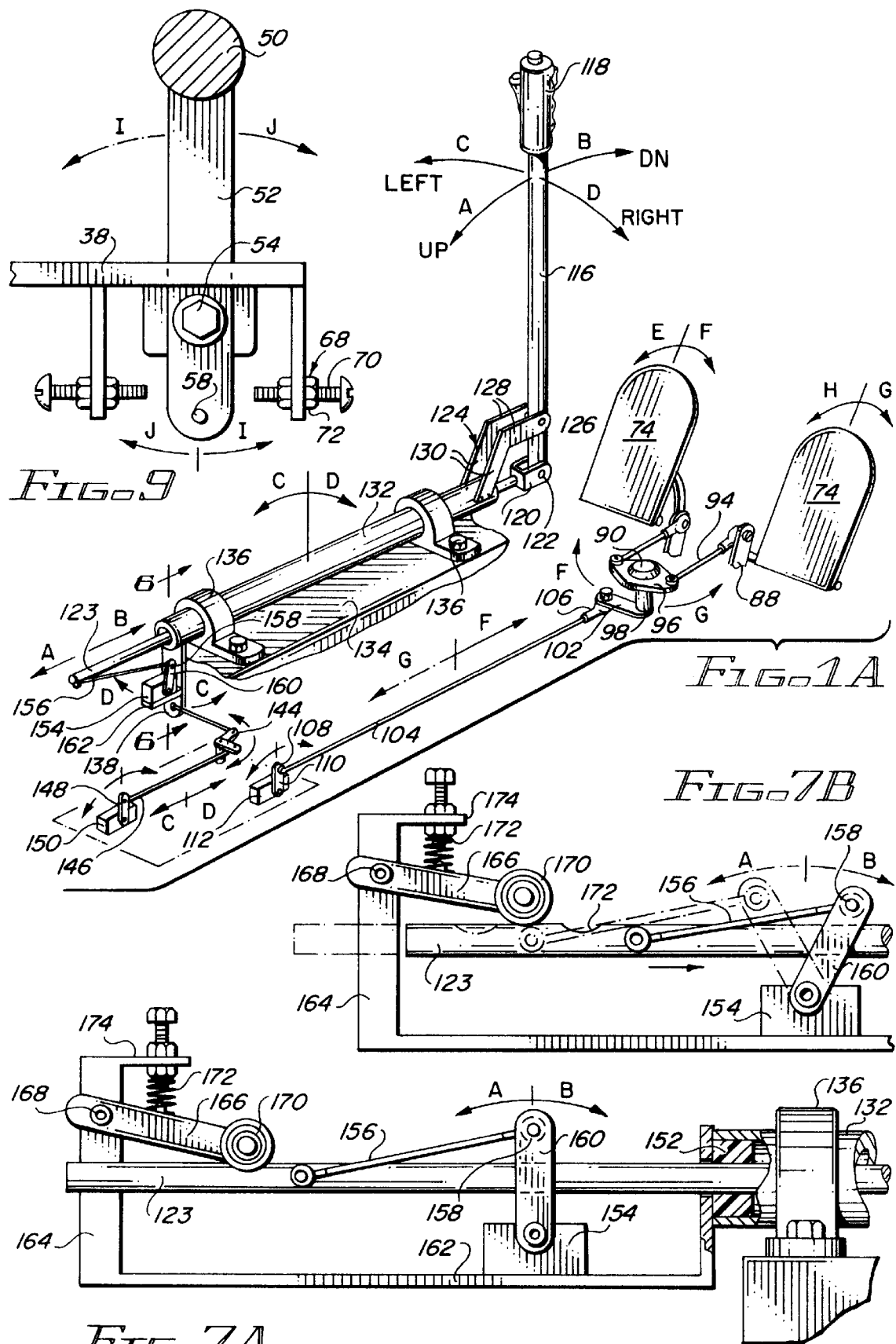

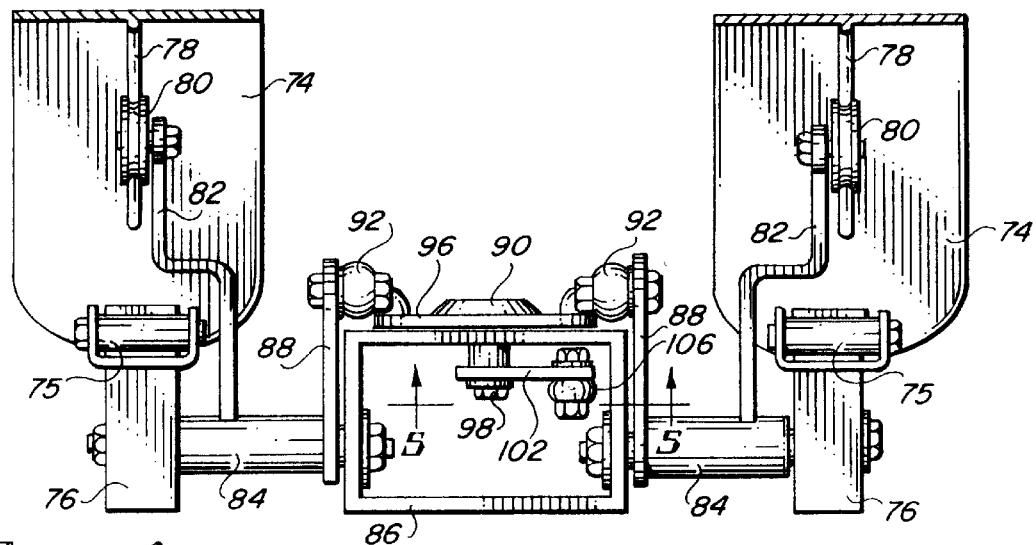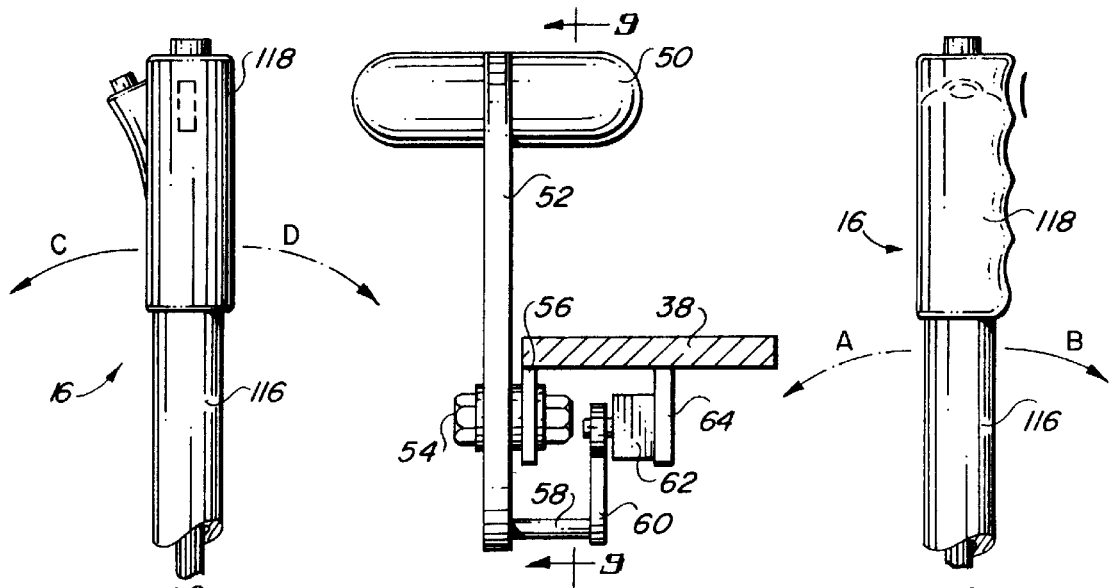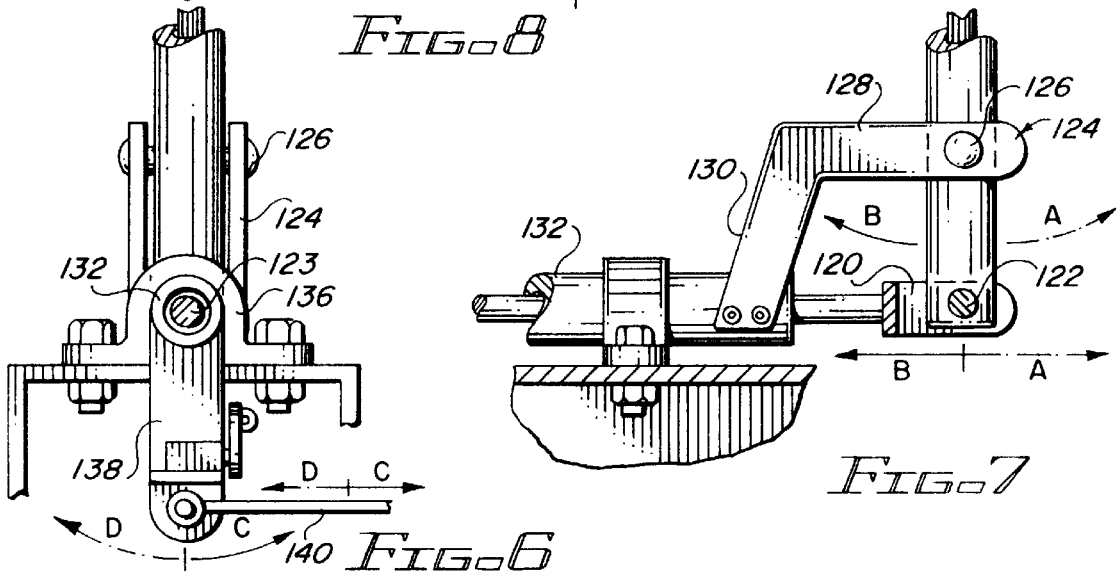

FLIGHT CONSOLE FOR RADIO CONTROLLED AIRCRAFT

TECHNICAL FIELD

This invention relates to the field of control mechanisms for directing radio controlled aircraft, and, more particularly, to control mechanisms which simulate an aircraft cockpit while controlling aircraft via radio.

BACKGROUND OF THE INVENTION

Various types of radio control mechanisms for drone aircraft are well known in the art. Most such mechanisms employ hand held radio transmitters the controls of which are manipulated by the operator to direct the operation of the aircraft. While operators of such equipment attempt to duplicate the actions of a pilot in an actual aircraft, such duplication is difficult with the hand held transmitters most commonly used.

Thus, there is a need for a control mechanism which more closely duplicates the actions of an on board pilot of an aircraft. The present invention interfaces electromechanically with a radio transmitter while simulating the cockpit of an actual aircraft.

Various solutions have been devised in attempts to overcome the problem. U.S. Pat. No. 4,386,914 entitled "Transmitter Extension Apparatus For Manipulating Model Vehicles" which issued on Jun. 7, 1983 to Dustman discloses an apparatus for controlling the control members of a transmitter used for sending radio signals to a receiver in a model airplane which emulates the actions of a pilot in a cockpit. Dustman mechanically connects via cables and the like to the levers on a hand held transmitter.

U.S. Pat. No. 4,464,116 entitled "Helicopter Flight Training Device" which issued Aug. 7, 1984 to Schoolcraft discloses a helicopter flight training device combining a flight station with a free flying radio controlled scale model of a helicopter. Movement of the flight controls is transmitted by means of threaded control rods to an electromechanical interface installed under the platform 2 or under the seat of bench 1.

U.S. Pat. No. 2,863,619 entitled "Aerodyne Remote Control System" which issued on Dec. 9, 1958 to Servanty discusses, in col. 13, the use of potentiometers in transmitting commands from an operator to an aerodyne.

U.S. Pat. No. 4,421,485 entitled "Model Flight Simulator" which issued on Dec. 20, 1983 to Geschwender shows a model flight simulator having an on/off switch to preserve the battery.

U.S. Pat. No. 3,526,043 entitled "Aviation Trainer" which issued on Sep. 1, 1970 to Frasca shows a simulator having electric trim switches. Switch 29 provides electric elevator trim which switch 338 provides electric rudder trim.

A book entitled "The World of Model Aircraft" by Guy R. Williams and published by G. P. Putnam's Sons of New York discloses on page 179 an elaborate Fly Seat made to resemble a pilot seat of a full sized airplane which controls the activities of the aircraft via a pivoting boom.

None of the known prior art disclose the combination set forth herein.

SUMMARY OF THE INVENTION

It is an object of this invention to provide an electromechanical interface between a pilot and a radio transmitter which simulates the cockpit of an actual aircraft.

It is a further object of this invention to provide an electromechanical interface which can function with the radio transmitters of the prior art.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 1A is a perspective view of the embodiment depicted in FIG. 1 showing the mechanical linkages of the present invention;

FIG. 4 is a front view of the foot pedals depicted in FIG. 1A;

FIG. 5 is a cross sectional bottom view of the foot pedals depicted in FIG. 4 taken along line 5—5;

FIG. 6 is rear view of the device depicted in FIG. 1A taken along line 6—6;

FIG. 7 is side view of the front portion of the joystick of the embodiment of FIG. 1;

FIG. 7A is a side view of the operation of an alternate embodiment of the rear portion of the joystick control;

FIG. 7B is a side view of the embodiment of FIG. 7A showing an up and down elevator neutral position;

FIG. 8 is a rear view of the throttle of the embodiment of FIG. 1 taken along line 8—8;

FIG. 9 is a cross sectional side view of the throttle depicted in FIG. 8 taken along line 9—9;

DESCRIPTION OF THE PREFERRED EMBODIMENT

Figure 1:
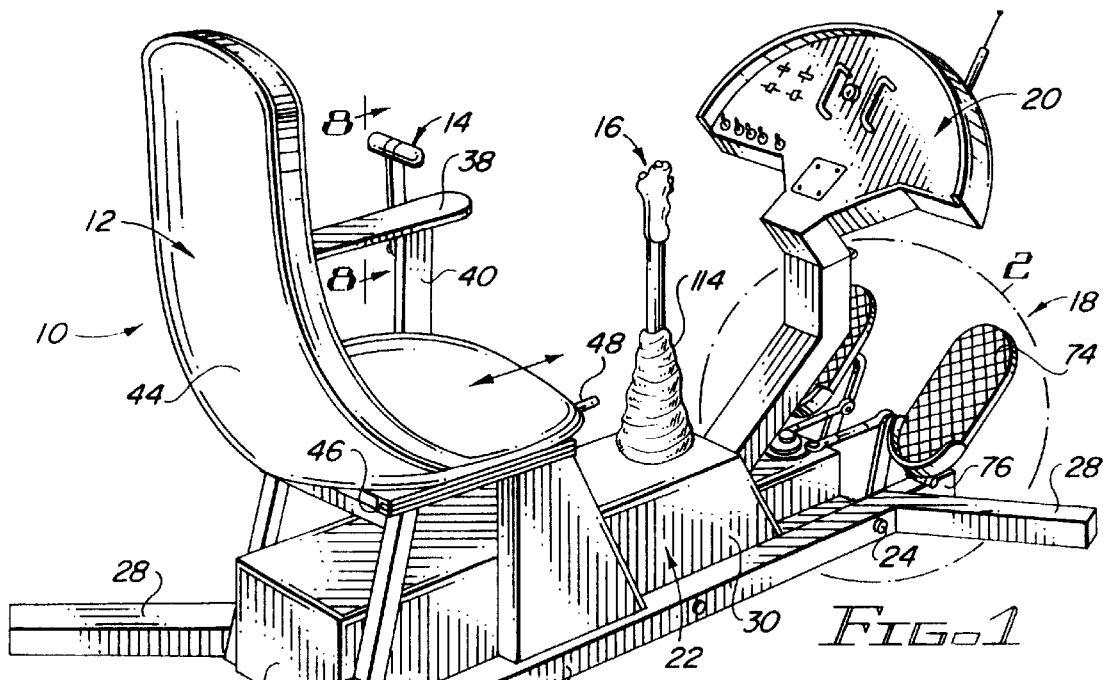
FIG. 1 is a perspective view of one embodiment of the present invention.

Referring more particularly to the drawings by characters of reference, FIGS. 1–7, 8–9 and 11 disclose one embodiment of a control mechanism 10 which emulates in the general the layout of an aircraft cockpit. The control mechanism apparatus as shown which electromechanically actuates a control board of a radio transmitter which, in turn, transmits radio signals to a receiver on board a model aircraft for actuating the various parts thereof.

In general, control mechanism 10 comprises a base frame 24 for providing a stable platform with a seat 12 mounted at the rear of base frame 24. A plurality of controls emulate the controls found in a cockpit of an actual aircraft for actuating the various parts thereof. These controls are mounted to base frame 24. A plurality of mechanical linkages are provided which transmit the position of each of the plurality of controls to a corresponding plurality of electrical devices. Each of the corresponding electrical devices is in electrical communication with the control board and the output of each of the electrical devices varies in accordance with the position of the controls. The radio signals are transmitted by the radio transmitter control board and vary in accordance with the electrical output of each of the electrical devices. The radio signals actuate the various parts of the model aircraft corresponding to each of the plurality of the controls.

In the presently preferred embodiment, control mechanism 10 comprises a seat 12; controls consisting of a throttle control 14, a joystick 16, and a rudder assembly 18, a control panel 20; a housing 22 and base frame 24.

Base frame 24 comprises two parallel, longitudinally oriented opposing frame members 26. Each frame member 26 has two legs 28 extending laterally outward from opposing ends of each frame member 26 at about a forty-five degree (45°) angle. Cross members (not shown) extend between each frame member 26 and are secured thereto by screws 29. Base frame 24 thereby provides a stable base for the other components of control mechanism to be mounted thereto.

Mounted rearwardly between frame members 26 is housing 22 which is generally a elongated, hollow box-like shape having side panels 30, top panel 32, rear panel 34 and front panel 36 (not shown). Housing 22 provides an enclosure for the operating components described below which substantially reduces the chances of damage caused by interference by foreign objects, clothing or other debris as well as exposure to the elements. Each panel 30, 32, 34 and 36 are removable to allow access to the interior of housing 22 for adjustments or repairs if needed.

Mounted directly above housing 22 is seat 12 having, preferably, an armrest 38 supported by an upwardly extending support arm 40 on the left side of seat 12. In the illustrated embodiment, rear legs 41 and front legs 42 of seat 12 are mounted to frame members 26. A seat portion 44 of seat 12 is mounted to a sliding track 46 having a lever control 48 which allows seat portion 44 to move forwardly and rearwardly to accommodate pilots of differing sizes.

As best seen in FIGS. 8 and 9, throttle control 14 comprises a throttle handle 50 mounted at one end of a throttle lever 52. A throttle pivot 54 is mounted to a throttle pivot support arm 56 which extends downwardly from armrest 38. Throttle pivot 54 allows lever 52 to move in the directions denoted by arrows I and J about throttle pivot 54.

Mounted to the portion of throttle lever 52 extending opposite throttle handle 50 is a throttle connecting pin 58. Throttle connecting pin 58 extends laterally from throttle lever 52 to one end of a throttle potentiometer lever 60. The opposing end of throttle potentiometer lever 60 is pivotally attached to a radial throttle potentiometer 62 which is mounted to throttle potentiometer support arm 64 which extends downwardly from armrest 38.

Extending downwardly from armrest 38 are two stop support arms 66 mounted forwardly and rearwardly of throttle lever 52. At the end of each stop support arm is a stop 68. In the preferred embodiment, each stop 68 is a screw 70 secured to stop support arm 66 by two opposing bolts 72. Screw 70 extends towards and limits the rotation of throttle lever 52.

As is well known in the art, rotation of the axis of radial throttle potentiometer 62 alters the electrical output thereof thereby providing control means for aircraft engine output. By convention, pushing throttle handle 50 forward in the direction of arrow J will increase engine RPM while pulling throttle handle rearwardly in the direction of arrow I will decrease engine RPM.

Those skilled in the art will recognize that other means of controlling the throttle may be used without departing the scope of the invention. For example, to control a helicopter, the throttle control 14 would be replaced with a collective and throttle attachment. A conventional collective and throttle attachment has a collective lever mounted horizontally near the pilot's left hip and operating in a like manner to the present throttle control. Raising the collective lever causes the helicopter to ascend while lowering the collective lever causes the helicopter to descend by controlling the pitch of the rotor blades. A twist type throttle (similar to a motorcycle) is mounted at the free end of the collective lever and twists on a bearing and tensioner which in turn rotates a potentiometer to raise and lower engine RPM.

As best seen in FIGS. 1A–5, forward of seat 12 and housing 22 is rudder assembly 18 which comprises two foot pedals 74 which control the aircraft rudder and nose wheel operation. The lower portion of each foot pedal 74 is mounted via a pedal pivot 75 to a pedal plate 76 extending forwardly from base frame 24. A semicircular heel plate 77 is also provided on the bottom front of each foot pedal 74 to assist the user in maintaining foot contact with pedal 74. The bottom of each foot pedal 74 includes a guide rod 78 centered and extending longitudinally thereon. A roller 80 engages and travels along guide rod 78 when foot pedal 74 is depressed. Roller 80 is mounted to a dogleg-shaped pedal arm 82 which engages a secondary pivot tube 84.

As best seen in FIG. 4, each pivot tube 84 is rotatably mounted between pedal plate 76 and a square tubular housing 86 which extends forwardly from and opens into housing 22 to enclose and protect the operative elements of rudder assembly 18. Attached to each pivot tube 84 opposite where dogleg-shaped pedal arm 82 engages tube 84 is a second pedal arm 88. Each second pedal arm 88 operatively engages a rudder main pivot shaft 90 via a ball link 92 and ball link rod 94.

Rudder main pivot shaft 90 includes a plate portion 96 atop housing 86 and a shaft portion 98 extending downwardly through housing 86. A bearing 100 is interposed between housing 86 and shaft portion 98 to allow shaft portion 98 to rotate freely clockwise or counterclockwise as pedals 74 are pushed in and out. Each ball link rod 94 is attached to plate portion 96 on opposing sides of shaft portion 98.

Within housing 86, shaft portion 98 engages a small rudder pivot arm 102 extending laterally therefrom which in turn engages a rudder control rod 104 extending rearwardly via a ball link swivel 106. Rudder control rod 104 extends through housing 86 to housing 22 where rod 104 engages a potentiometer ball link swivel 108 and ball link rod 110 to a rudder control potentiometer 112.

In operation, depressing right pedal 74 in the direction denoted by the arrow G causes plate portion 96 to rotate counterclockwise denoted by arrow C, which in turn, pushes control rod 104 in the direction denoted by arrow G. In addition, rotation of plate portion 96 causes the left pedal 74 to be lifted as denoted by arrow E. Depressing left pedal 74 in the direction denoted by the arrow F causes plate portion 96 to rotate clockwise denoted by arrow F, which in turn, pulls control rod 104 in the direction denoted by arrow F. In addition, rotation of plate portion 96 causes the right pedal 74 to be lifted as denoted by arrow H. The pulling and pushing of control rod 104 in the directions F and G depending on which pedal 74 is depressed varies the electrical output of rudder control potentiometer 112 to provide a control mechanism for the rudder and nose wheel of the aircraft.

In accordance with convention, depressing the left pedal will cause the aircraft to steer left while depressing the right pedal will cause the aircraft to steer right, either via the rudder in flight or the nose wheel while taxiing.

Figure 2:
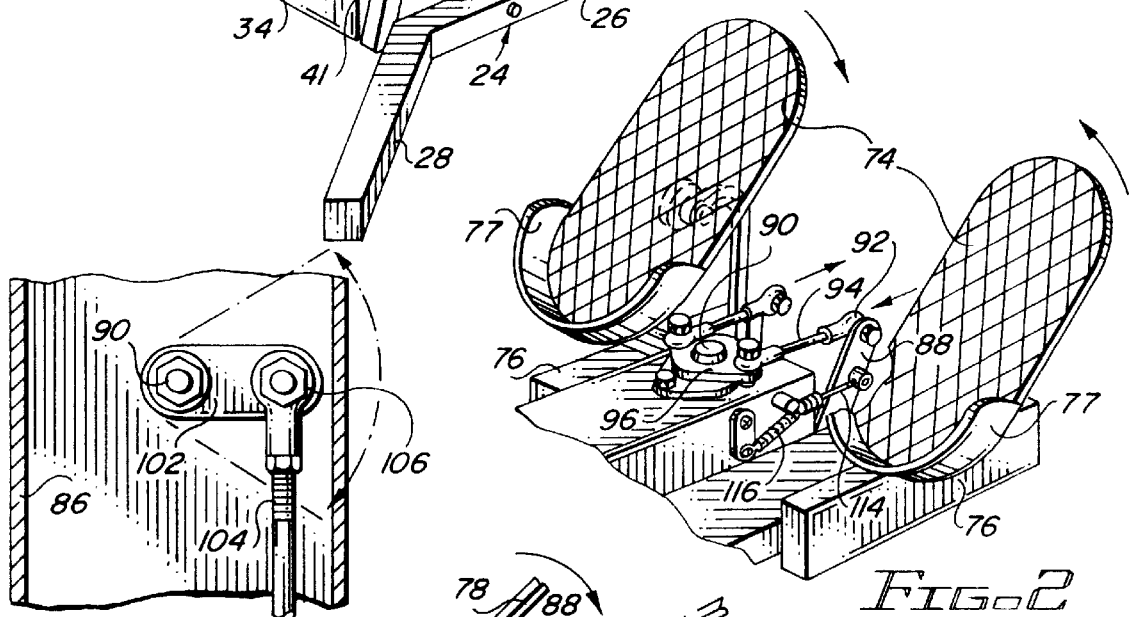
FIG. 2 is a close up of an alternate embodiment of the circled area 2 of the device depicted in FIG. 1.
Figure 3:
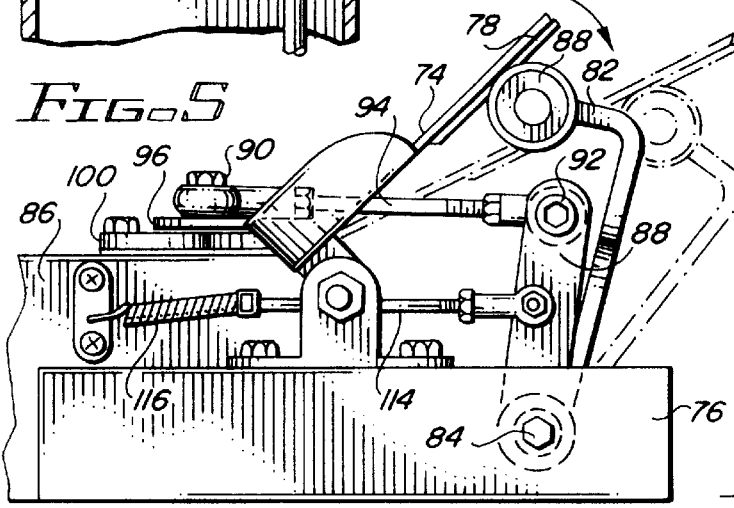
FIG. 3 is a side view of the alternate embodiment of the foot pedals depicted in FIG. 2.

In an alternate embodiment best seen in FIGS. 2 and 3, a centering means is provided consisting of a third rudder arm 114 attached to each second pedal arm 88 between the secondary pivot tube 84 and ball link rod 94. Third rudder arm 114 is attached to a spring 116 which, in turn, is attached to housing 86. The combination of the opposing third rudder arms 114 and springs 116 on each second pedal arm 88 bring pedals 74 to a neutral position when the user removes pressure therefrom.

Extending upwardly from housing 22 just forward of seat 12 is joystick 16. A flexible dust cover 114 is provided where joystick 16 enters housing 22 to prevent foreign material from entering housing 22.

As best seen in FIGS. 1A, 6 and 7, joystick 16 comprises a vertical shaft 116 having a grip 118 at the upper end thereof. At the lower end, the Y-shaped end of a clevis bearing 120 is mounted to vertical shaft 116 by a clevis bolt 122 while the opposite end of clevis bearing 120 connects to elevator control rod 123. On vertical-shaft 116, above clevis bearing 120 are two L-shaped brackets 124 which are mounted on either side of vertical shaft 116 by pivot bearing 126 extending through horizontally oriented legs 128 of brackets 124 and shaft 116. Vertical shaft 116 pivots about pivot bearing 126 as shown by arrows A and B.

Horizontally oriented legs 128 of brackets 124 extend rearwardly from vertical shaft 116. Vertically oriented legs 130 extend downwardly from horizontally oriented legs 128 and are mounted to the front end of the exterior of an aileron control tube 132. Aileron control tube 132 extends rearwardly in housing 22 beneath seat 12 and is mounted to a floor 134 of housing 22 by two pillow block bearings 136 which allow aileron control tube 132 to rotate therein in the directions indicated by arrows C and D best seen in FIG. 1A.

Extending downwardly from the rear end of aileron control tube 132 is an aileron pivot arm 138. A first aileron control rod 140 having ball link ends 142 extends laterally from aileron pivot arm 138 to connect to a bellcrank 90° pivot 144. A second aileron control rod 146 extends rearwardly from pivot 144 to a short control arm 148 which is operatively connected to an aileron control radial potentiometer 150. Preferably, aileron pivot arm 138, bell crank 90° pivot 144 and short control arm 146 are all be drilled with radius adjustment holes to increase or decrease the sensitivity of the aileron control.

Elevator control rod 123 extends from clevis bearing 120 through aileron control tube 132 and is centered and supported at the rearmost point of aileron control tube 132 by a bushing 152. When vertical shaft 116 is moved in direction indicated by arrows A and B, elevator control rod will move forwardly or rearwardly, respectively within aileron control tube 132.

The rear end of elevator control rod 132 is connected to a elevator control potentiometer 154 by way of an elevator control rod 156, an elevator ball link 158 and an elevator control arm 160. Elevator control potentiometer 154 is mounted to a bracket 162 which extends from aileron pivot arm 138. Mounting elevator control potentiometer 154 thus allowing the linkages thereto to be unaffected by any rotation of aileron control tube 132 does not effect elevator control.

In operation, pulling rearwardly on joystick 16 in the direction of arrow A causes vertical shaft 116 to rotate about pivot bearing 126 which pushes elevator control rod in the direction denoted by A. The arrows B denote the operation if joystick 16 is pushed forwardly. The pulling and pushing of joystick 16 in the directions A and B varies the electrical output of elevator control potentiometer 154 to provide a control mechanism for the elevators of the aircraft.

If joystick 16 is pushed left in the direction of arrow C, the brackets 124 cause the aileron control tube 132 to rotate counterclockwise as denoted by C. The arrows D denote the operation if joystick 16 is pushed right. The pulling and pushing of joystick 16 in the directions C and D varies the electrical output of aileron control potentiometer 112 to provide a control mechanism for the ailerons of the aircraft.

In accordance with convention, pushing joystick 16 forward will cause the aircraft to dive, pulling rearward will cause the aircraft to climb, pushing right will cause the aircraft to roll right and pushing left will cause the aircraft to roll left.

FIGS. 7A and 7B illustrate an alternate embodiment of the elevator control means which provides a pilot with tactile input as to a neutral position for the elevators. Specifically, bracket 162 is constructed to extend further rearwardly and to include rear upwardly extending arm 164. A first arm 166 is mounted at one end to arm 164 at a pivot 168. A roller 170 is mounted at the opposite end of arm 164 and positioned to ride upon elevator control rod 123. Arm 164 and roller 170 are biased to contact with elevator control rod 123 by spring 172 which is mounted to a horizontal extension 174 of arm 164. A groove 176 is cut into elevator control rod 123 and engages roller 170 when joystick 16 is oriented at 90° to elevator control rod 123, i.e. in a level flight position. When joystick 16 is thus positioned, there will be a definite feel transmitted to the pilot. In addition, groove 176 and roller 170 will cooperate to keep the aircraft level if the pilot needs to temporarily disengage hands from joystick 16.

Figure 10:
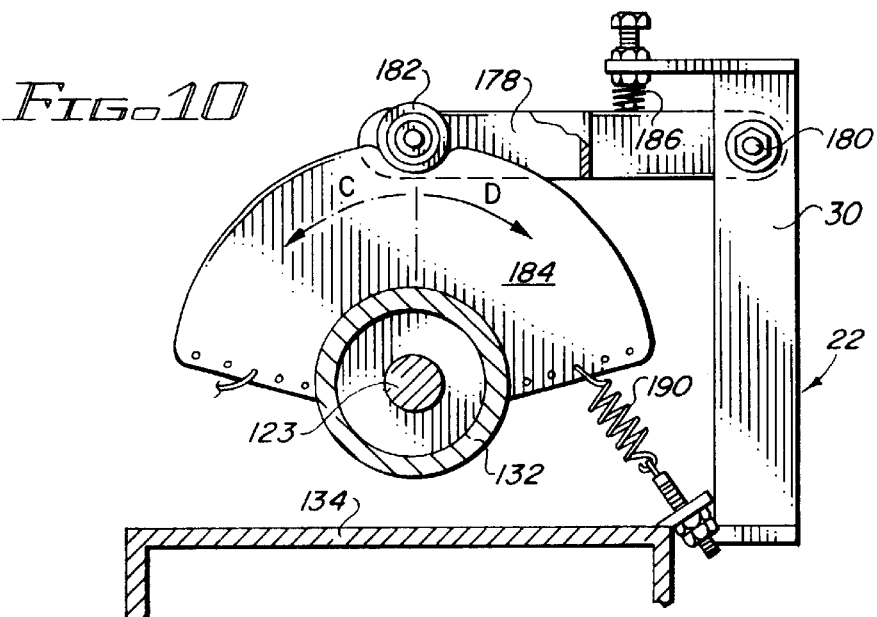
FIG. 10 is an alternate embodiment of the joystick showing a left and right aileron neutral position.

FIG. 10 illustrates an alternate embodiment of the aileron control means which provides a pilot with tactile input as to a neutral position for the ailerons. Specifically, a second arm 178 is mounted at one end to a side panel 30 of housing 22 at a pivot 180, preferably just forward of the rearmost pillow block bearing 136. A aileron roller 182 is mounted at the opposite end of second arm 178 and positioned to ride upon a aileron control fan 184. Aileron control fan 184 is firmly mounted to the exterior of aileron control tube 132.

Second arm 178 and aileron roller 182 are biased to contact with aileron control fan 184 by spring 186 which is mounted to a lateral extension 186 extending from side panel 30. An aileron groove 188 is cut into aileron control fan 184 and engages roller 182 when joystick 16 is vertically oriented, i.e. in an even (non-rolling) flight position. When joystick 16 is thus positioned, there will be a definite feel transmitted to the pilot. In addition, groove 188 and roller 182 will cooperate to keep the aircraft even if the pilot needs to temporarily disengage hands from joystick 16.

In addition, a second spring 190 may be mounted to housing 22 to bias aileron fan 184, and thus aileron control tube 132, to the neutral or even position.

Figure 11:
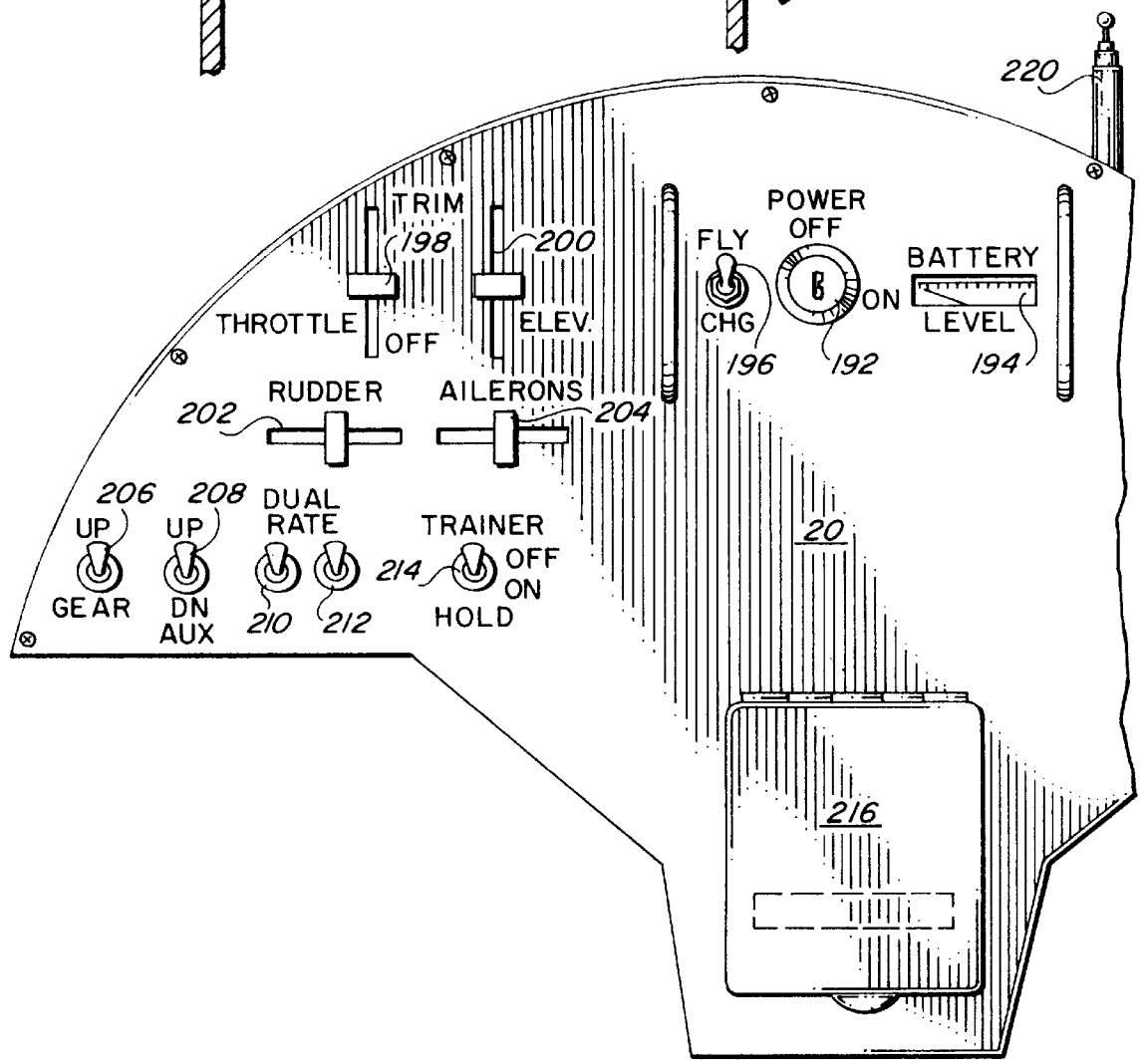
FIG. 11 is a close up of the control panel of the device depicted in FIG. 1.

Best seen in FIG. 11 is control panel 20 which includes a keyed on/off switch 192, a battery level meter 194, a charge/fly selector switch 196, a throttle trim 198, an elevator trim 200, a rudder trim 202, a aileron trim 204, a landing gear up/down toggle 206, an auxiliary toggle 208, an aileron dual rate switch 210, an elevator dual rate switch 212, a trainer switch 214, a door 216 for accessing a control board 218 and an antenna 220.

Figure 12:
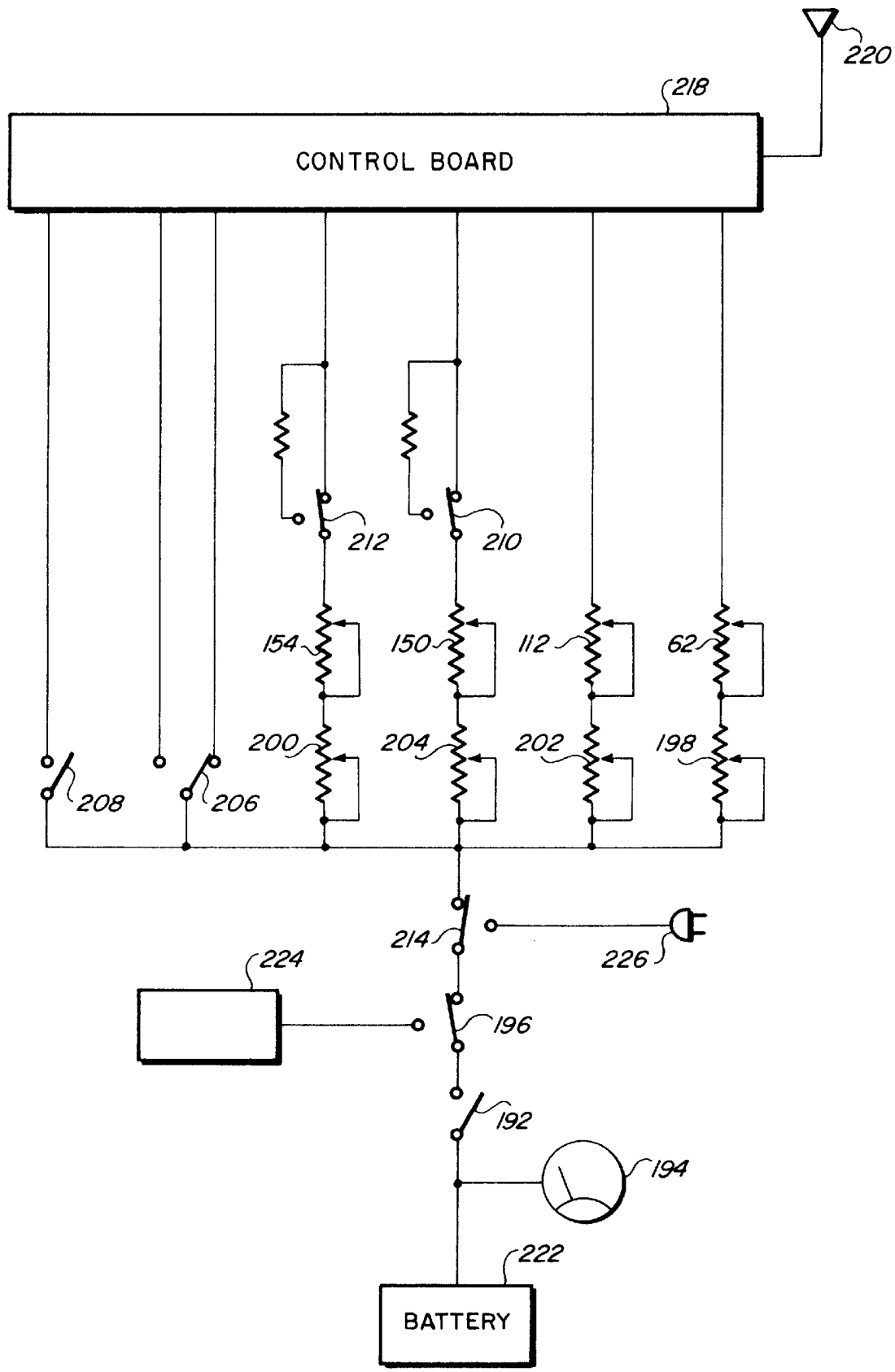
FIG. 12 is a schematic showing the operation of the device.

As best illustrated in FIGS. 11 and 12, the device is preferably operated from a battery 222 which is preferably connected to the control mechanisms using keyed on/off switch 192. Battery level meter 194 lets the user know the amount of power available at any given time. In the event the battery needs a charge, charge/fly switch 196 can be placed in the charge position and power obtained via an electrical plug 224 to charge battery 222.

Trims 200, 202 and 204 are all slide potentiometers which are used to "trim" the aircraft to level, even flight when joystick 16 and rudder assembly 18 are in their neutral positions. Trimming the aircraft involves putting joystick 16 and rudder assembly 18 in their respective neutral positions and then sliding the respective trim switches until the aircraft is in level, even flight. Trim 198 is used to set the idle speed when the throttle is pulled all the way back. Sliding throttle trim 198 all the way down shuts off the aircraft engine.

Control board 218 is, preferably, purchased from current makers of such equipment such as Airtronics. Specifically, control board 218 is found within hand held controllers commercially available from hobby shops across the country. Electrical communication is provided between all of the potentiometers and the control panel with the control board 218. Some control boards 218 do offer options which can be employed with the present invention.

For example, some control boards provide dual rate switches 210 and 212 which reduce the output of the aileron and elevator controls to allow for a more graceful flight. In other words, with a dual rate switch 210 or 212 on, the ailerons or elevators would move a certain percentage, perhaps as little as 20%, of the movement of the ailerons or elevators with the dual rate switch 210 or 212 off.

Another option is to allow a flight instructor to connect in a hand held controller to an appropriate controller plug 226 and flip a trainer switch 214 whereby the trainer controller can override the system instructions.

Although only certain embodiments have been illustrated and described, it will be apparent to those skilled in the art that various changes and modifications may be made therein without departing from the spirit of the invention or from the scope of the appended claims.

What is claimed is:

1. A control mechanism apparatus for electromechanically actuating a radio transmitter which transmits radio signals to a receiver on board a model aircraft, the apparatus comprising:
    a base frame for providing a stable platform,
    a seat mounted at the rear of the base frame,
    a control panel mounted at the front and above the base frame,
    a throttle handle mounted at one end of a throttle lever, the throttle lever being pivotally mounted to an armrest at a midpoint of the throttle lever,
    a joystick,
    a rudder assembly having two foot pedals,
    a first mechanical means for transmitting the position of the foot pedals to a first electrical means, the first electrical means being in electrical communication with the control board, the output of the first electrical means varying in accordance with the position of the foot pedals,
    a second mechanical means for transmitting the lateral position of the joystick to a second electrical means, the second electrical means being in electrical communication with the control board, the output of the second electrical means varying in accordance with the lateral position of the joystick,
    a third mechanical means for transmitting the longitudinal position of the joystick to a third electrical means, the third electrical means being in electrical communication with the control board, the output of the third electrical means varying in accordance with the longitudinal position of the joystick, and
    a throttle connecting pin extending laterally from the throttle lever opposite the throttle handle, the throttle connecting pin being attached to one end of a throttle potentiometer lever, the other end of the throttle potentiometer lever being pivotally attached to a potentiometer, the throttle potentiometer lever being operatively connected to the potentiometer, the potentiometer being in electrical communication with the control board, the output of the potentiometer varying in accordance with the position of the throttle handle.

2. The apparatus of claim 1 wherein the seat includes the armrest.

3. The apparatus of claim 1 wherein the first electrical means comprises a potentiometer and the first mechanical means being mounted to the foot pedals and operatively connected to the potentiometer.

4. The apparatus of claim 3 wherein the first mechanical means further comprises a guide rod mounted on the bottom of each foot pedal, a roller engaging and traveling along each of the guide rods when the respective foot pedal is depressed, the roller being mounted to a pedal arm which engages a secondary pivot tube, each of the pivot tubes being rotatably mounted and connected to a second pedal arm, each of the second pedal arms operatively engaging a rudder main pivot shaft on opposing sides thereof, the main pivot shaft engaging a small rudder pivot arm extending laterally therefrom, the small rudder pivot arm engaging one end of a rudder control rod extending rearwardly therefrom, the other end of the rudder potentiometer lever being pivotally attached to the potentiometer.

5. The apparatus of claim 4 further comprising means for centering the rudder pedals.

6. The apparatus of claim 1 wherein the second electrical means comprises an aileron potentiometer and the third electrical means comprises an elevator potentiometer, the second and third mechanical means being mounted to the joystick and operatively connected to the aileron and elevator potentiometers, respectively.

7. The apparatus of claim 1 wherein the base frame includes two parallel, longitudinally oriented opposing frame members, each of the frame members having two legs extending laterally outward from opposing ends thereof at about a forty-five degree angle, the base frame further having cross members extending between and connecting the two frame members.

8. The apparatus of claim 1 further comprising a housing which encloses the mechanical means and the electrical means.

9. The apparatus of claim 1 wherein the seat is mounted to a sliding track having a lever control which allows the seat to move forwardly and rearwardly to accommodate differing heights.

10. The apparatus of claim 1 wherein the control panel includes a throttle trim potentiometer, an elevator trim potentiometer, a rudder trim potentiometer, and an aileron trim potentiometer, the trim potentiometers being used to trim the aircraft to level, even flight when the controls are in their neutral positions.

11. The apparatus of claim 10 further comprising a means for mounting the radio transmitter within the control panel and an antenna mounted to the control panel in electrical communication with the radio transmitter.

12. The apparatus of claim 1 further comprising a rechargeable battery in electrical communication with the radio transmitter for providing electrical power thereto.

13. A control mechanism apparatus for electromechanically actuating a radio transmitter which transmits radio signals to a receiver on board a model aircraft, the apparatus comprising:

a base frame for providing a stable platform, a seat mounted at the rear of the base frame, a control panel mounted at the front and above the base frame, a throttle control, a joystick, a rudder assembly having two foot pedals, a first mechanical means for transmitting the position of the foot pedals to a first electrical means, the first electrical means being in electrical communication with the control board, the output of the first electrical means varying in accordance with the position of the foot pedals, a second mechanical means for transmitting the lateral position of the joystick to a second electrical means, the second electrical means being in electrical communication with the control board, the output of the second electrical means varying in accordance with the lateral position of the joystick, a third mechanical means for transmitting the longitudinal position of the joystick to a third electrical means, the third electrical means being in electrical communication with the control board, the output of the third electrical means varying in accordance with the longitudinal position of the joystick, and a fourth mechanical means for transmitting the position of the throttle control to a fourth electrical means, the fourth electrical means being in electrical communication with the control board, the output of the fourth electrical means varying in accordance with the position of the throttle control the second electrical means comprising an aileron potentiometer and the third electrical means comprising an elevator potentiometer, the second and third mechanical means being mounted to the joystick and operatively connected to the aileron and elevator potentiometers, respectively, the second mechanical means comprising two brackets which are pivotally mounted on either side of the joystick, the brackets being mounted to the front end of the exterior of an aileron control tube extending rearwardly from the joystick, the aileron control tube being rotatably mounted to the base frame, an aileron pivot arm being mounted to the aileron control tube and a first aileron control rod extending laterally from the aileron pivot arm and connecting a bellcrank pivot, a second aileron control rod extending rearwardly from bellcrank pivot to a short control arm is operatively connected to the aileron potentiometer.

14. The apparatus of claim 13 wherein the third mechanical means comprises an elevator control rod extending through the aileron control tube and connected at one end to a clevis bearing mounted at the bottom of the joystick, the other end of the elevator control rod being connected to an elevator control rod, the elevator control rod being operatively connected to the elevator potentiometer, the elevator potentiometer being mounted to the aileron pivot arm.

15. The apparatus of claim 14 further comprising means for centering the joystick.

16. A control mechanism apparatus for electromechanically actuating a radio transmitter which transmits radio signals to a receiver on board a model aircraft, the apparatus comprising:

a base frame having two parallel, longitudinally oriented opposing frame members, each of the frame members having two legs extending laterally outward from opposing ends thereof at about a forty-five degree angle, the base frame further having cross members extending between and connecting the two frame members for providing a stable platform, a seat mounted at the rear of the base frame, the seat being mounted to a sliding track having a lever control which allows the seat to move forwardly and rearwardly to accommodate differing heights, a throttle control, a joystick, a rudder assembly having two foot pedals, the throttle control, the joystick and the rudder assembly emulating a cockpit of an actual aircraft mounted to the base frame, a potentiometer and a guide rod mounted on the bottom of each foot pedal, a roller engaging and traveling along each of the guide rods when the respective foot pedal is depressed, the roller being mounted to a pedal arm which engages a secondary pivot tube, each of the pivot tubes being rotatable mounted and connected to a second pedal arm, each of the second pedal arms operatively engaging a rudder main pivot shaft on opposing sides thereof, the main pivot shaft engaging a small rudder pivot arm extending laterally therefrom, the small rudder pivot arm engaging one end of a rudder control rod extending rearwardly therefrom, the other end of the throttle potentiometer lever being pivotally attached to the potentiometer, the potentiometer being in electrical communication with the radio transmitter, the output of the potentiometer varying in accordance with the position of the foot pedals, an aileron potentiometer and an elevator potentiometer, two brackets pivotally mounted on either side of the joystick, the brackets being mounted to the front end of the exterior of an aileron control tube extending rearwardly from the joystick, the aileron control tube being rotatable mounted to the base frame, an aileron pivot arm being mounted to the aileron control tube and a first aileron control rod extending laterally from the aileron pivot arm and connecting a bellcrank pivot, a second aileron control rod extending rearwardly from bellcrank pivot to a short control arm is operatively connected to the aileron potentiometer, the aileron potentiometer being in electrical communication with the radio transmitter, the output of the aileron potentiometer varying in accordance with the lateral position of the joystick, an elevator control rod extending through the aileron control tube and connected at one end to a clevis bearing mounted at the bottom of the joystick, the other end of the elevator control rod being connected to an elevator control rod, the elevator control rod being operatively connected to the elevator potentiometer, the elevator potentiometer being mounted to the aileron pivot arm, the elevator potentiometer being in electrical communication with the radio transmitter, the output of the elevator potentiometer varying in accordance with the longitudinal position of the joystick, and a throttle potentiometer and a throttle handle mounted at one end of a throttle lever, the throttle lever being pivotally mounted to the armrest at a midpoint of the throttle lever, a throttle connecting pin extending laterally from the end of the throttle lever opposite the throttle handle, the throttle connecting pin being attached to one end of a throttle potentiometer lever, the other end of the throttle potentiometer lever being pivotally attached to the throttle potentiometer, the throttle potentiometer being in electrical communication with the radio transmitter, the output of the throttle potentiometer varying in accordance with the position of the throttle control.

* * * * *